United States Patent
Wu (10) Patent No.: US 8,836,699 B2
(45) Date of Patent: Sep. 16, 2014

(54) GENERATION OF LANDMARK ARCHITECTURE AND SCULPTURE BASED ON CHINESE CHARACTERS

(75) Inventor: Chiou Yeong Wu, Rowland Heights, CA (US)

(73) Assignee: Chiung Yu Chen, Rowland Heights, CA (US)

( * ) Notice: Subject to any disclaimer, the term of this patent is extended or adjusted under 35 U.S.C. 154(b) by 116 days.

(21) Appl. No.: 13/371,700

(22) Filed: Feb. 13, 2012

(65) Prior Publication Data

US 2013/0207972 A1    Aug. 15, 2013

Related U.S. Application Data

(63) Continuation-in-part of application No. 13/021,599, filed on Feb. 4, 2011, now abandoned.

(51) Int. Cl.
*G06T 17/00* (2006.01)

(52) U.S. Cl.
CPC ..................... *G06T 17/00* (2013.01)
USPC ........................................................ 345/420

(58) Field of Classification Search
CPC ......... G06T 11/20; G06T 11/203; G06T 9/20; G06T 11/40; G06F 1/214; G06K 15/02; G06K 9/481; G09G 5/24; G09G 5/243; G09G 5/246; G09G 5/26; G09G 5/28
USPC .......................................... 345/420, 467–475
See application file for complete search history.

(56) References Cited

U.S. PATENT DOCUMENTS

| | | | |
|---|---|---|---|
| 5,805,783 A * | 9/1998 | Ellson et al. .................. | 345/468 |
| 6,563,499 B1 * | 5/2003 | Waupotitsch et al. ........ | 345/420 |
| 7,511,718 B2 * | 3/2009 | Subramanian et al. ....... | 345/619 |
| 7,965,297 B2 * | 6/2011 | Hoppe .......................... | 345/564 |
| 2002/0105515 A1 * | 8/2002 | Mochizuki .................... | 345/419 |
| 2003/0071810 A1 * | 4/2003 | Shoov et al. .................. | 345/420 |
| 2004/0189666 A1 * | 9/2004 | Frisken et al. ................ | 345/611 |
| 2005/0289447 A1 * | 12/2005 | Hadley et al. .............. | 715/501.1 |
| 2006/0080673 A1 * | 4/2006 | Allie et al. ..................... | 719/317 |
| 2006/0250393 A1 * | 11/2006 | Tsang et al. .................. | 345/420 |
| 2008/0068383 A1 * | 3/2008 | Dowling ...................... | 345/441 |
| 2008/0100587 A1 * | 5/2008 | Sano et al. .................... | 345/173 |
| 2009/0315895 A1 * | 12/2009 | Pahud et al. .................. | 345/473 |
| 2010/0053171 A1 * | 3/2010 | Cheng .......................... | 345/469 |
| 2010/0076959 A1 * | 3/2010 | Ramani et al. ................ | 707/722 |
| 2010/0245362 A1 * | 9/2010 | Huang et al. ................. | 345/467 |
| 2011/0018880 A1 * | 1/2011 | Whited et al. ................ | 345/473 |
| 2011/0292031 A1 * | 12/2011 | Zhu et al. ...................... | 345/419 |
| 2012/0032958 A1 * | 2/2012 | Werline ........................ | 345/420 |
| 2013/0120426 A1 * | 5/2013 | DiVerdi et al. ............... | 345/589 |
| 2013/0222385 A1 * | 8/2013 | Dorsey et al. ................ | 345/427 |

* cited by examiner

*Primary Examiner* — David Zarka
*Assistant Examiner* — Brian Kravitz

(57) ABSTRACT

By applying computer aided method, different combinations of 3D objects derived out of a set of pictorial characters may be generated in a computer system. Some of the 3D objects may be used as sources of landmark designs. Users can simply refine these objects with 'function', 'program' and 'budget' to further achieve their specific design goal. By screening a limited number of computer-generated 3D objects based on a selected candidate character set and operation rules, the system enables a designer to focus on selected potential objects as an initial design step, rather than starting everything from the scratch as in a conventional process.

10 Claims, 7 Drawing Sheets

Fig 5 ( Presentation of merged C3 &C4 of Fig.4 )

GENERATION OF LANDMARK ARCHITECTURE AND SCULPTURE BASED ON CHINESE CHARACTERS

BACKGROUND OF THE INVENTION

1. Field of Invention

This application relates to computer-implemented design, and more specifically to three-dimensional (3D) presentational of pictorial characters.

2. Background

Pictorial characters such as traditional Chinese characters have been widely used in Asian languages such as Chinese, Japanese, Korean, etc. Unlike the alphabetical words, each of the pictorial characters is a two-dimensional (2D) picture forming out of a sequence of stokes. There are thirty-five hundred commonly used and eighty thousand known Chinese characters. The variation and complexity of these characters can be used as building blocks in drafting and design software, which are normally deficient in 'draw' box design for designing building elements.

Figure 1A:
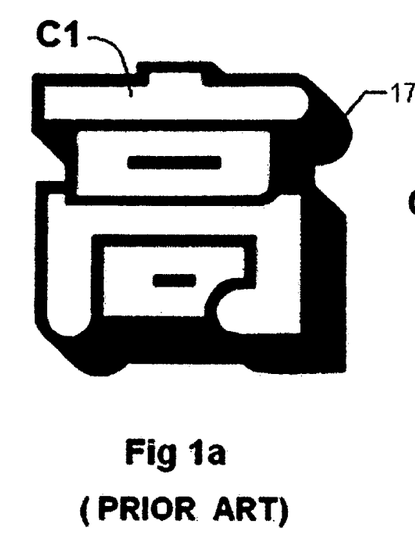
FIG. 1a illustrates a prior art, which is an extruded two-dimensional character.

Chinese characters generally appear in two dimensions. Calligraphy style which was used in the past is still being practiced as an art form. FIG. 1a shows an extruded character, which is an example of 3D presentation in commercial advertisements or billboard designs. The thickness 17 and a portion of the character is placed in the front of the other to make it a 3D look. In general, an extruded character comprises a thickness with two-dimension character. Other Chinese characters may have been occasionally used in architectural forms in both eastern and western cultures. For example, the elevation view of a high rise building, Tuntex Sky Tower in Kao-Hsiung, Taiwan took the shape of the Chinese character shown in C1 of FIG. 1b. The floor plan of the Unity Temple, designed by Frank Lloyd Wright, appears as another Chinese character shown in C2 of FIG. 2a. Both buildings took the form of an extruded character as shown in C1 of FIG. 1a, which comprises a two-dimensional character with a thickness.

Current software is either deficient in 'draw' box design or limited in 3D functions. Conventional computer graphic software may have good 3D presentation functionalities, however, with line, arc, donut, rectangle, polygon, etc., as basic elements in a typical drawing tool, users are often lead to a simple 3D form design. To design an intriguing and complex form, users typically rely on sketching, and model making, which is a rather time-consuming process. As such, there is still a need to further improve the design process by providing a computer aided environment, where a large amount of design constructs associated with pictorial characters may be systematically explored and presented on a computer display.

SUMMARY OF INVENTION

An embodiment of present invention includes applying computer aided method. Different combinations of 3D objects derived out of a set of pictorial characters may be generated in a computer system. Some of the 3D objects may be used as sources of landmark designs. Users can simply refine these objects with 'function' and 'program' to further achieve their specific design goal. By screening a limited number of computer-generated 3D objects based on a selected candidate character set and operation rules, the system enables a designer to focus on selected potential objects as an initial design step, rather than starting everything from the scratch as in a conventional process.

In another embodiment, an existing two dimensional character can be converted into a 3D character based on a sequence of strokes. Each stroke will be placed onto a layer inside a cube. The 3D character can still be identified if viewing it at particular angles. Each 3D character will be used as a building block, which can be superimposed mathematically with other 3D characters using computer software, which generates arrays of various 3D objects. The generated objects are then screened and analyzed by users for various applications.

In another embodiment, computer screen saver may be generated based on a number of inputted pictorial words. Screens showing sequences of 2D to 3D assembly, or vice versa, may be displayed on the computer as a screen saver. The entered words may be stacked, morphed, or superimposed to further generate a plurality of pictorial forms in accordance selected operation rules.

It is the object of the present invention to render a pictorial character in multi-layer, three-dimensional form that is different from the conventional, single-layer 3D fonts.

It is the object of the present invention to break apart Chinese characters based on sequences of strokes and stack the strokes in a plurality of layers inside a cube.

It is the object of the present invention to superimpose 3D characters mathematically by computer-implemented method, which can manipulate fused 3D characters manually or by a computer program.

It is the object of the present invention to screen hundreds or thousands of 3D fused characters for landmark design.

It is the object of the present invention to create 3D sculptures or architecture based on 3D characters.

BRIEF DESCRIPTION OF DRAWINGS

FIG. 8 shows cloning and translation to generate a duplicated pair of the fused 3D character shown in FIG. 7a.

DETAIL DESCRIPTION OF INVENTION

Figure 1B:
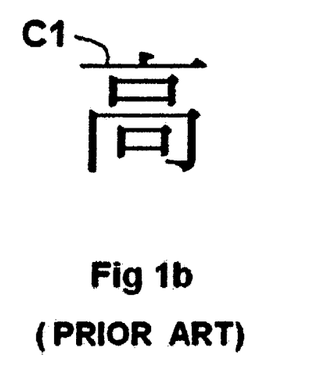
FIG. 1b illustrates a prior art two-dimensional character.
Figure 2A:
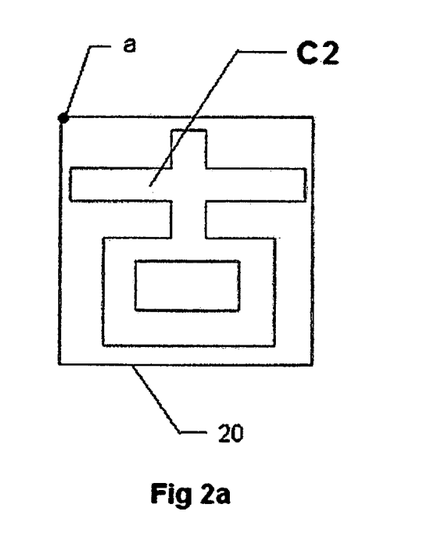
FIG. 2a illustrates a Chinese character inside a square.
Figure 2B:
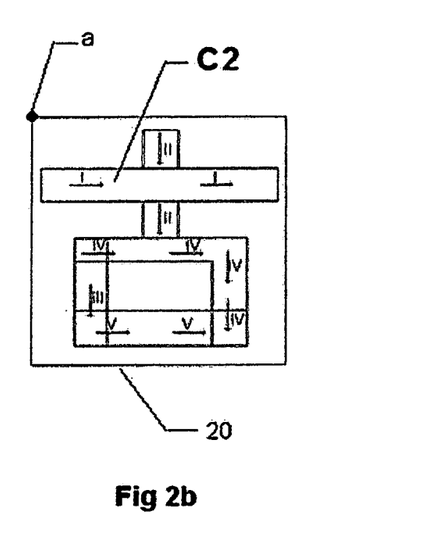
FIG. 2b depicts a character, which can be broken down by Calligraphy strokes.

Chinese character will be used as examples. C1 of FIG. 1a shows a prior art 3D presentation of a Chinese character, which basically takes the shape of a traditional 2D form with a thickness 17 added in the third dimension. C1 of FIG. 1b is a character representing a conventional 2D type font, of which strokes are laid on a same layer. C2 of FIG. 2a and FIG. 2b show a same character inside a square. The square 20 is a boundary of the character, which is made visible for illustration purpose. C2 of FIG. 2b further shows the strokes of the character labeled in the order of a nominal writing sequence. It is noted that every Chinese character can be converted to a 3D character in a variety of forms, which can be subsequently used as 3D building blocks for higher levels of design according to certain operation rules. Examples illustrated in FIGS. 3-12 are further described in the following paragraphs.

a. Constructing a Word in a Cube

Figure 3:
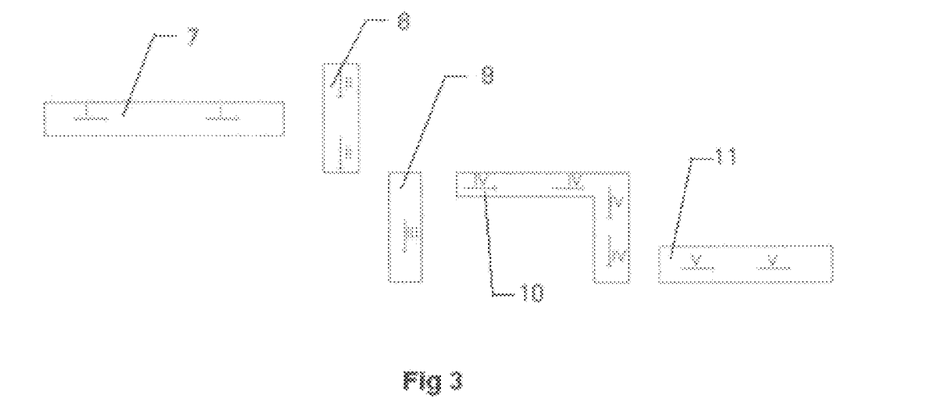
FIG. 3 Illustrates individual strokes taken apart from the character shown in FIG. 2b based on a sequence of strokes.
Figure 4:
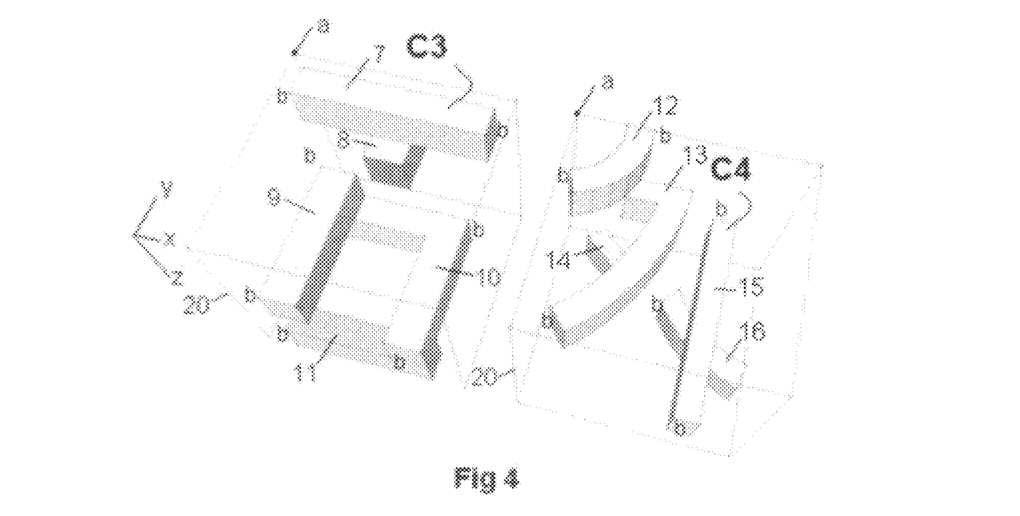
FIG. 4 Illustrates two 3D characters placed in a respective cube.

It is well known that a pictorial character is composed of a sequence of calligraphy strokes. FIG. 3 shows how the character of C2 of FIG. 2a is dissembled into a sequence of calligraphy strokes. Strokes 7, 8, 9, 10 and 11 are labeled according to a nominal writing order I through V. Each stroke can now be reconstructed as a 3D element and placed in a variety of sequences, from top to bottom, onto a layer within a cube or other scalable 3D shapes. In FIG. 4, the width, length, and height of a stroke are mapped to the x-, y-, and z-axis of a three-dimensional coordinates, respectively. The height (or thickness) of a stroke can be determined by evenly dividing the edge of the cube by the maximum number of connected strokes in a character. For example, strokes 9, 10 and 11 form the most connected part in character C3 of FIG. 4. Thus the thickness of the stroke equates to a third of the cubic edge. It is noted, however, the invention is not limited to the way how a stroke acquires its thickness here. For example, for artistic reasons, the thickness of a stroke may be pre-assigned with any desirable value and stored in a database as attributes of a character. Likewise, there are a variety of ways for placing consecutive strokes in the cube. The example shown in FIG. 4 have all the connected strokes placed on top of the other, but placement rules may be set up to allow different ways of stroke placement such as floating with a proper gap, translating to a different contact point, rotating relatively to a default orientation, scaling to a size different from a default value etc. It is noted that floating strokes are allowed in a design stage, but may require support from their immediate neighbor strokes. Under such circumstances, small supporting elements such as steel or transparent fiber glass may be used in the implementation stage.

b. Merging Two Words in a Cube

Figure 5:
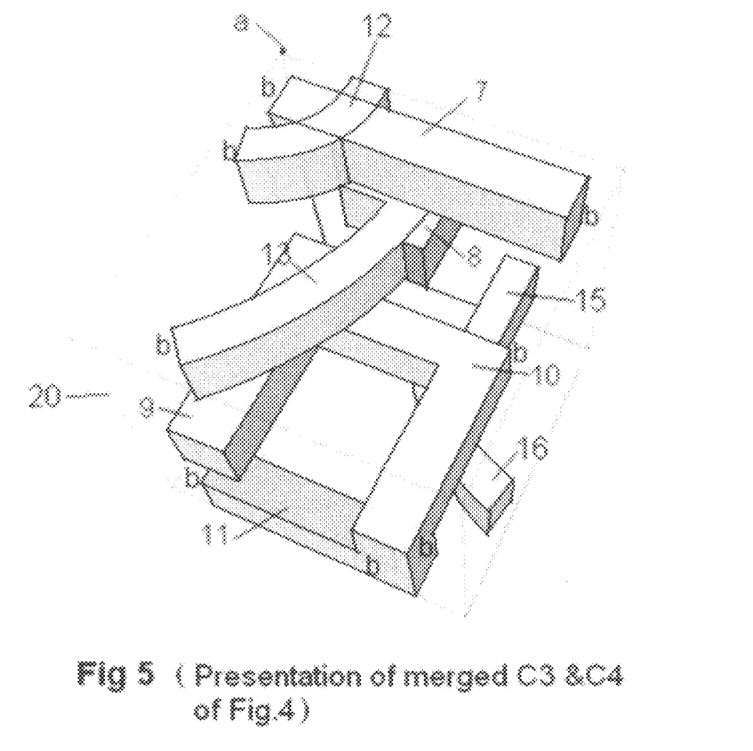
FIG. 5 Depicts a fusion of the two 3D characters shown in FIG. 4.
Figure 6:
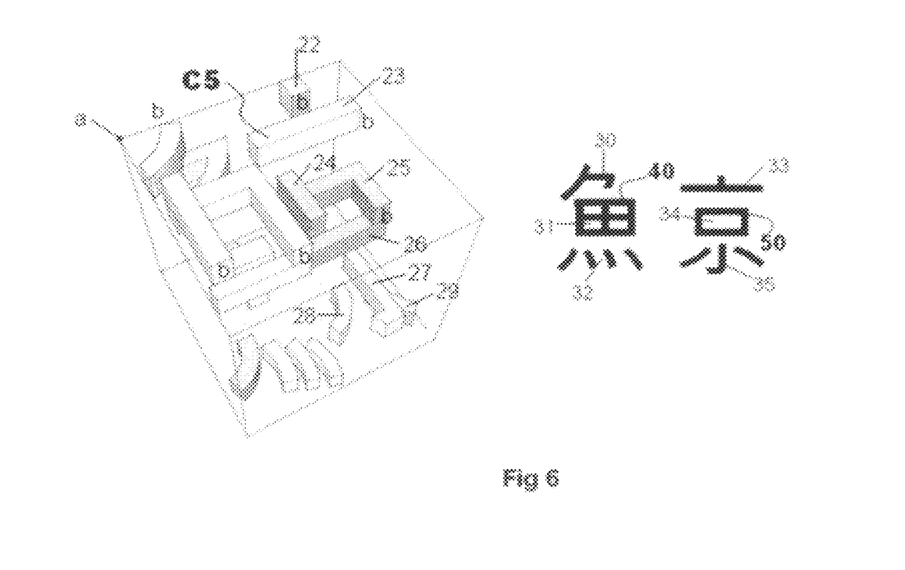
FIG. 6 illustrates another more sophisticated 3D character, wherein a word may be represented in terms of a number of root parts.

FIG. 5 shows a fused 3D character, with strokes superimposed from the characters C3 and C4 of FIG. 4. The example shows how two characters, each placed in an identical cube, can be merged together to form a new 3D structure. As can be seen, the character C4 of FIG. 4 is composed of two unconnected root parts with strokes labeled 12-14 and 15-16, respectively. The root parts can be handled separately as shown in FIG. 6, wherein strokes 12-14 of character C4 are placed on top of character C3, while strokes 15-16 of character C4 are placed beneath or share with the first two layers of character C3. Because the two-dimensional form on the x-y plane has not changed, the top-view of the fused characters C3 and C4 maintains as an overlap of the two characters. For practical reasons, and as a rule of thumb, the root parts of a plurality of characters may be considered as higher level of building blocks for the placement of the plurality of characters into a cube. It is noted, however, the invention is not limited to the way described here as how a root part acquires its position in a multi-layer presentation of a plurality of characters. There are obviously many desirable variations in the placement and they are considered falling within the spirit of this invention. For example, for artistic reasons, prior to placement of a root part, the root part may experience manipulations such as rotation, translation, scaling, and morphing. Root parts of various desirable forms may be stored in a database for retrieval at the time of computer-aided design.

c. Operation Based on Root Parts

Each Chinese character may be further partitioned into a number of root parts, each representing a short sequence of consecutive or localized strokes. The reason they are called root parts because most of them can be repeatedly found in different words. For example, FIG. 6 shows a composite word C5 comprising two main root parts 40 and 50, each of which is by itself a character and can be further partitioned another root parts such 30, 31, and 32 in the overall portion of 40. Since each root part is a sequence of localized strokes, it often simplifies the design process by applying a same operation rule to the same root part. For example, the 3D structure of FIG. 6 may be thought of comprising different root parts formed by stroke sequences 22-23, 24-26, 27-29, etc. Hence, alternatively, it is of benefit to express the selected words in terms of a sequence of root parts, rather than a sequence of strokes, and build up a pool of 3D structural elements based on the limited number of root parts. The design process for rendering a 3D object out of multiple words would be similar to the process of rendering a 3D object out of a single word, except for the fact that the former is based on a sequence of root parts instead of a sequence of strokes.

d. Designing with Key Cubes

Figure 7A:
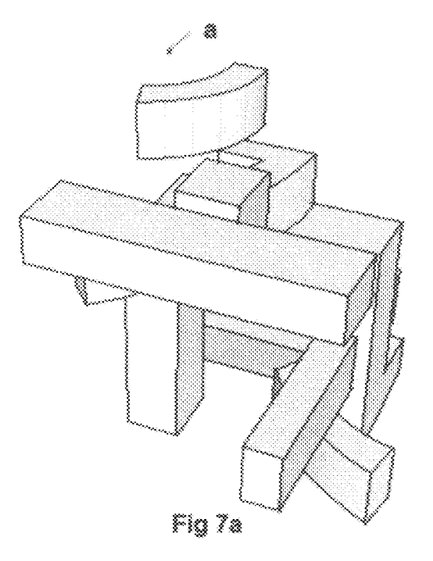
FIG. 7a Illustrates a fusion of the two 3D characters shown in FIG. 4, with the first character rotated 90°, then merged with the second character.
Figure 7B:
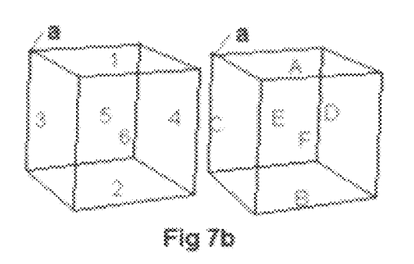
FIG. 7b illustrates the faces of two key cubes labeled with 1 to 6, and A to F, respectively.
Figure 7C:
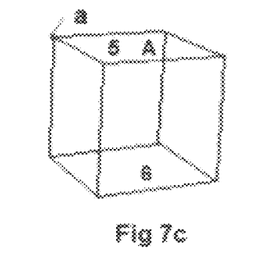
FIG. 7c Illustrates a key cube representing a fused two key cubes of FIG. 7b, with face 5 of the first cube lined up with face A of the second cube.
Figure 8:
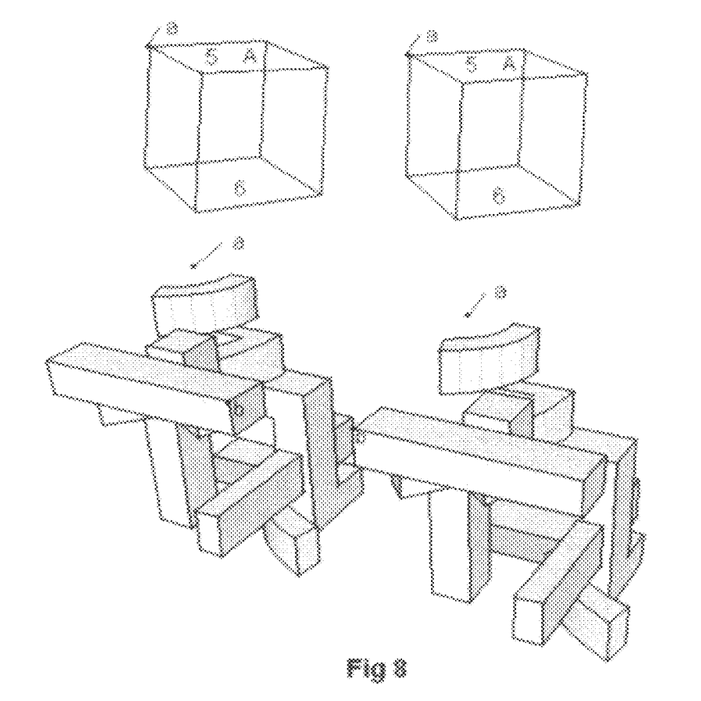
Figure 9:
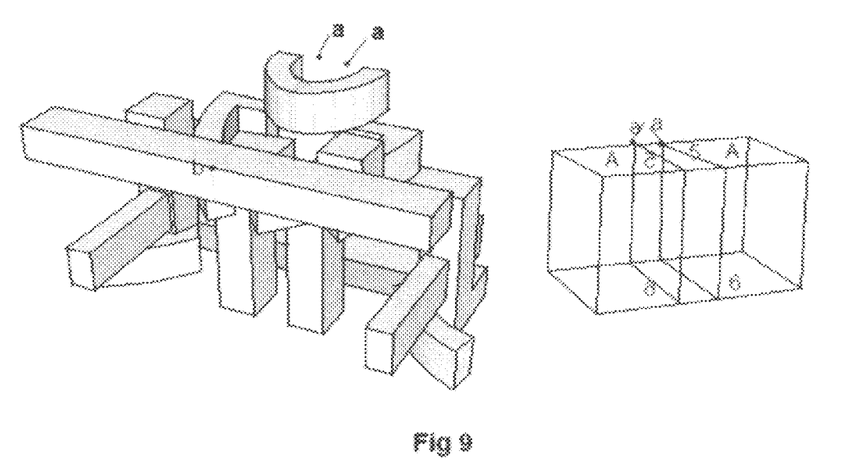
FIG. 9 shows a combined pair of the fused 3D character shown in FIG. 7a, with one fused 3D character mirror-reflecting the other.
Figure 10:
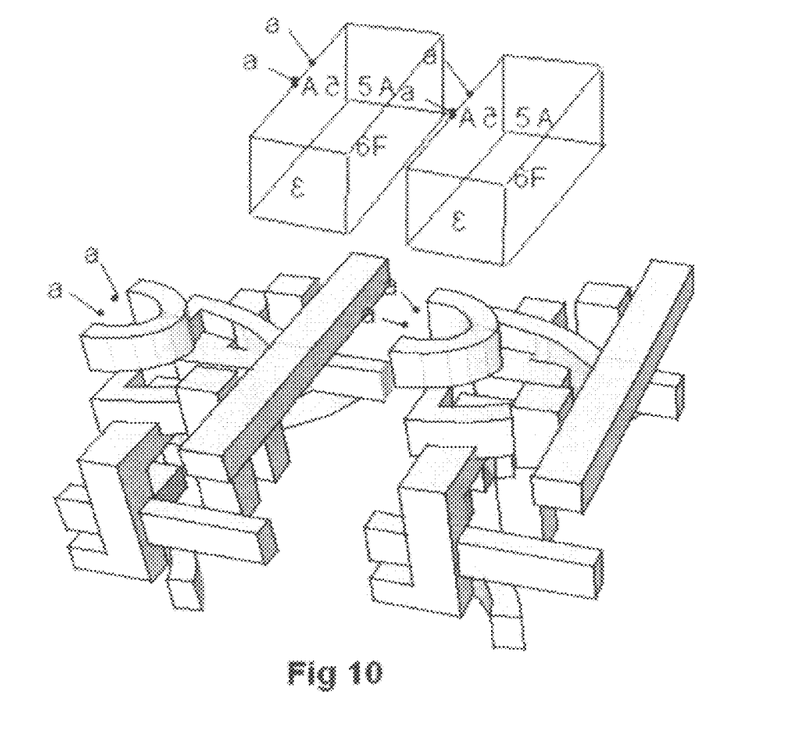
FIG. 10 illustrates cloning and translating of the fused 3D form of FIG. 9.
Figure 11:
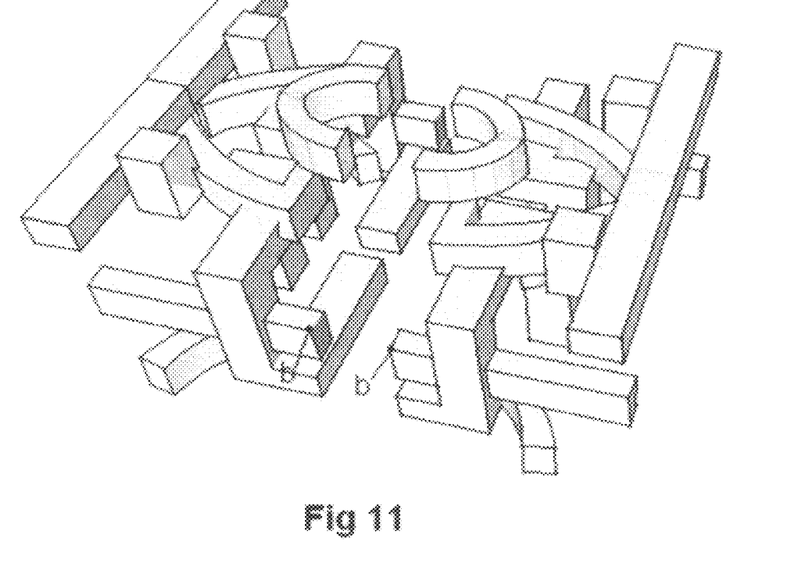
FIG. 11 illustrates mirror-flipping one of the fused 3D pair of FIG. 10.
Figure 12:
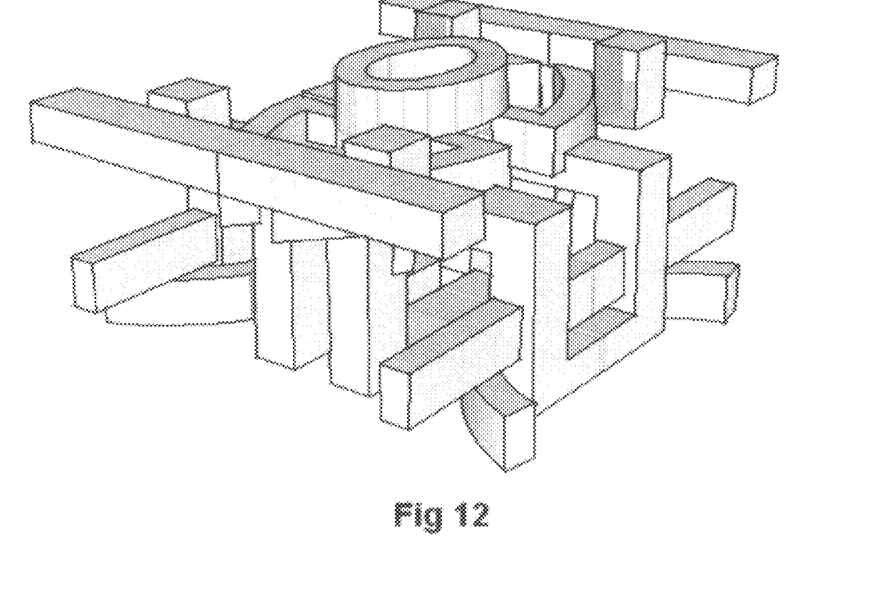
FIG. 12 illustrates morphing of the fused 3D pair by joining them at a specified point.

In a computer-aided design environment, it is desirable to label an isotopic cube with proper orientations such that one may further apply placement rules on a plurality of cubes, each housing one or more characters. FIGS. 7a-7b are examples of designs with key cubes, wherein a key cube is a cube with annotated six surfaces. For example, in order to distinguish the two cubes of FIG. 4, the cube of one character is assigned with annotated faces 1 through 6 and the other with faces A through F (see FIG. 7b). A rotation of 90° can now be applied to the key cube annotated with faces 1-6 such that face 5 is now rotated to the top, as shown in FIG. 7c. The resultant placement of a fused (or merged) character pair of FIG. 4 is shown in FIG. 7a, wherein character 3 of FIG. 4 has been rotated by 90°, following the same rotation given in FIG. 7b, prior to the merge. With the key cube, it becomes feasible to instruct a design tool to make a clone out of an existing structure in a cube, either in identical or mirror-symmetrical forms, and butting or stacking a plurality of cubes to create higher hierarchical level of designs. FIG. 8 illustrates an identical cloned pair of the structure of FIG. 7a. FIG. 9 is a result of butting a pair of symmetrically cloned pair of FIG. 7a. The design is then advanced to another level of hierarchy, as shown in FIG. 10, by cloning an identical structure of FIG. 9, making the clone mirror symmetrical to the original (see FIG. 11), and butting the pair at specified points "a" and "b" (see FIG. 12). While it may appear artistically sophisticate in the resultant structure of FIG. 12, it all started with two simple Chinese words shown in FIG. 4. It is clear that the outcomes would be quite different when applying different construction and/or placement rules to the same set of characters. Thus, in analogy the set of pictorial characters form as a gene pool in a database, the cloning and merging process takes the similarity of an evolution process for a proper species to come out, wherein a designer now takes the initiator and selector's roles by adjusting the computer-aided design rules and make his or her selections out of plentiful choices from the rendered 3D objects in an interactive manner. Such a design process is suitable for individuals, such as sculptors or architects, who look for creative and/or artistic ideas. On the other hand, a fully automated design environment may also be established for general users who take part in the process by simply choosing a set of pre-determined rules from a database and specify a level of complexity for certain designated words. Applications in this simple environment can be directed to, but not limited to, language education, template creation, or screen saver generation, wherein a user inputs a number of words and a complexity level of fusion of the words, followed by the rendition of a few variations of resultant 3D structures on a computer display, with or without the showing of intermediate pictures.

Figure 13:
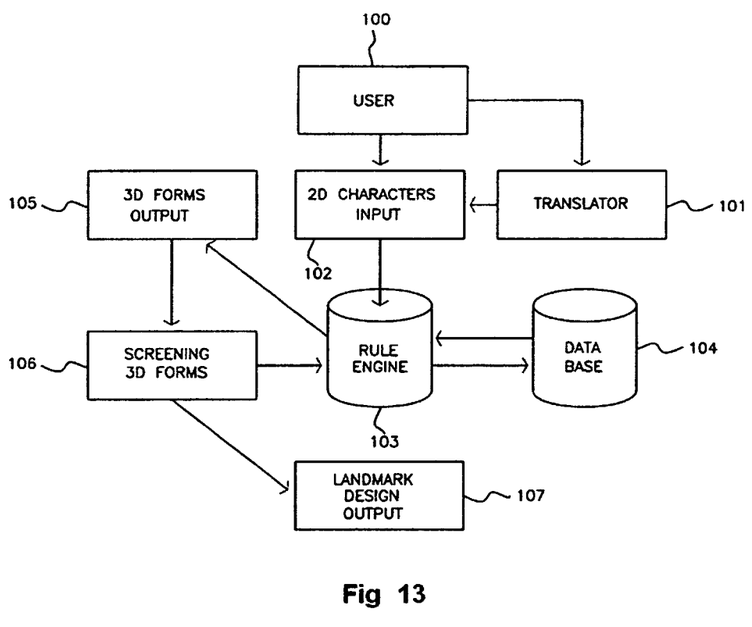
FIG. 13 Illustrates a block diagram for generation of 3D forms according to an embodiment of the present invention.

FIG. 13 illustrates an embodiment of the present invention in a flow diagram. A user 100 may input one or more pictorial characters with any sort of computer inputting means such as keyboard, mouse, or voice activated entry. For instance, Chinese characters can be entered using typical entry methods such as 'pinyin', 'root shape' and 'hybrid', or applying existing character recognition tool for handwritten words. Other users who are not familiar with the existing methods may rely on a language translator 101 to enter characters 102. In a batch type of screening, a user may not have to personally enter all the desirable words, but pick a set of characters from a dictionary or check in pre-categorized groups of words. The selected characters are analyzed, with identified root parts and strokes, in Rule Engine 103. The Rule Engine 103 then retrieves the corresponding 3D root parts and/or strokes from Data Base 104, wherein pre-processed parts and strokes may be stored. Corresponding 3D forms or characters, each housed in a cube, are generated and further combined (or equivalently called fused, merged, or superimposed) according to a selected or default set of operation rules. There will be multiple candidate 3D forms output 105 available. The user can select the best one by either interactively screening 106 through any sort of display means such as a computer display or a printer. Operation rules such as cloning, flipping, rotating, translating, scaling, overlaying and morphing can be established as default, or selectable in accordance with the user's selection. It is the noted that the outcome of the design may not be directly implementable. For example, a landmark design output 107 generated from the system may be further modified to fit for architectural implementation by going through the conventional 'function', 'structure', 'program' and 'budget' checks.

The foregoing description of the exemplary embodiments of the disclosure has been presented only for the purposes of illustration and description and is not intended to be exhaustive or to limit the disclosure to the precise forms disclosed. Many modifications and variations are possible in light of the above description. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

I claim:

1. A computer-implemented method for generating a presentation of three-dimensional (3D) pictorial characters on a computer display, the method comprising:
    selecting at least one pictorial character by a user, wherein each character is represented by a sequence of calligraphic strokes and each stroke is selected from a group of 3D structural elements;
    constructing at least one 3D object corresponding to the calligraphic strokes of the selected at least one pictorial character according to a first set of placement rules; and
    rendering the at least one 3D object on the computer display, each 3D object comprises a plurality of structural layers, wherein each structural layer comprises at least one 3D structural element and at least two structural layers are placed at different heights relative to a base plane of the corresponding 3D object, wherein the first set of placement rules include translating, cloning, scaling, flipping, morphing, and overlapping, each allowing for a change relative to a corresponding default value associated with the placement of each 3D structural element, each 3D structural element corresponding to a stroke of the at least one selected pictorial character, wherein a second set of placement rules, which include rotating, translating, cloning, scaling, flipping, morphing, and overlapping, may be applied on at least one root part of the selected character, each rule allows for a change relative to a default value associated with the at least one root part, and wherein each root part comprises at least two strokes forming a portion of one of the selected pictorial characters.

2. The method of claim 1, wherein a plurality of the selected pictorial characters are further superimposed or butted into one 3D structure in accordance with the second set of placement rules applied on at least one composite root part of the selected characters, wherein said composite root part is formed out of a subset of consecutive strokes comprising the selected plurality of pictorial characters.

3. A system for generating a presentation of three-dimensional (3D) pictorial characters on a computer display, the system comprising at least a processor having a program executing computer-implemented steps of:
    selecting at least one pictorial character by a user, wherein each character is represented by a sequence of calligraphic strokes and each stroke is selected from a group of 3D structural elements;
    storing information related to the presentation of the 3D pictorial characters in a database;
    constructing at least one 3D object corresponding to the calligraphic strokes of the selected at least one pictorial character according to a first set of placement rules; and
    rendering the at least one 3D object, each 3D object comprises a plurality of structural layers, wherein each structural layer comprises at least one 3D structural element and at least two structural layers are placed at different heights relative to a base plane of each 3D object, wherein the first set of placement rules include translating, cloning, scaling, flipping, morphing, and overlapping, each allowing for a change relative to a corresponding default value associated with the placement of each 3D structural element, each 3D structural element corresponding to a stroke of the selected pictorial character, wherein a second set of placement rules, which include rotating, translating, cloning, scaling, flipping, morphing, and overlapping, may be applied on at least one root part of the selected character, each rule allows for a change relative to a default value associated with the at least one root part, and wherein each root part comprises at least two strokes forming a portion of one of the selected pictorial characters.

4. The system of claim 3, wherein a plurality of the selected pictorial characters are further superimposed or butted into one 3D structure in accordance with the second set of placement rules applied on at least one composite root part of the selected characters, and wherein each root part comprises at least two strokes forming a portion of one of the selected pictorial characters and wherein said composite root part is formed out of a subset of consecutive strokes comprising the selected plurality of pictorial characters.

5. A non-transitory computer-readable medium storing software instructions in modules, wherein the modules are executable by a computer system for implementing a method comprising:

selecting at least one pictorial character by a user, wherein each character is represented by a sequence of calligraphic strokes and each stroke is selected from a group of 3D structural elements;

constructing at least one 3D object corresponding to the calligraphic strokes of the selected at least one pictorial character according to a first set of placement rules;

and rendering the at least one 3D object on the computer display, each 3D object comprises a plurality of structural layers, wherein each structural layer comprises at least one 3D structural element and at least two structural layers are placed at different heights relative to a base plane of the corresponding 3D object, wherein the selecting, constructing, and rendering steps are implemented in the same order as they appear, wherein the first set of placement rules include translating, cloning, scaling, flipping, morphine, and overlapping, each allowing for a change relative to a corresponding default value associated with the placement of each 3D structural element, each 3D structural element corresponding to a stroke of the selected pictorial character, wherein a second set of placement rules, which include rotating, translating, cloning, scaling, flipping, morphing, and overlapping, may be applied on at least one root part of the selected character, each rule allows for a change relative to a default value associated with the at least one root part, and wherein each root part comprises at least two strokes forming a portion of one of the selected pictorial characters.

6. The medium of claim 5, wherein a plurality of the selected pictorial characters are further superimposed or butted into one 3D structure in accordance with the second set of placement rules applied on at least one composite root part of the selected characters, and wherein said composite root part is formed out of a subset of consecutive strokes comprising the selected plurality of pictorial characters.

7. The method of claim 1, wherein the generated presentation of three-dimensional (3D) pictorial characters is displayed on a computer as a screen saver.

8. The method of claim 1, wherein the generated presentation of three-dimensional (3D) pictorial characters displays a screen saver showing a sequence of two-dimensional (2D)-to-3D or 3D-to-2D assembly process.

9. The method of claim 1, wherein the constructed 3D object is part of a landmark design.

10. The method of claim 1, wherein the constructed 3D object is part of a 3D sculpture or architecture design.

* * * * *